United States Patent
Kim et al.

(10) Patent No.: US 10,396,383 B2
(45) Date of Patent: Aug. 27, 2019

(54) MEMBRANE ELECTRODE ASSEMBLY AND FUEL CELL COMPRISING THE SAME

(71) Applicant: KOREA INSTITUTE OF SCIENCE AND TECHNOLOGY, Seoul (KR)

(72) Inventors: Hyoung-Juhn Kim, Seoul (KR); So Young Lee, Seoul (KR); Jieon Chae, Seoul (KR); Jong Hyun Jang, Seoul (KR); Sung Jong Yoo, Seoul (KR); Jin Young Kim, Seoul (KR); Hyun Seo Park, Seoul (KR); Dirk Henkensmeier, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 183 days.

(21) Appl. No.: 15/679,562

(22) Filed: Aug. 17, 2017

(65) Prior Publication Data
US 2018/0212264 A1    Jul. 26, 2018

(30) Foreign Application Priority Data
Jan. 24, 2017 (KR) .................. 10-2017-0010891

(51) Int. Cl.
| | |
|---|---|
| *H01M 8/1004* | (2016.01) |
| *H01M 8/1016* | (2016.01) |
| *H01M 8/04089* | (2016.01) |
| *H01M 8/04291* | (2016.01) |

(52) U.S. Cl.
CPC ..... *H01M 8/1004* (2013.01); *H01M 8/04089* (2013.01); *H01M 8/04291* (2013.01); *H01M 8/1016* (2013.01); *H01M 2300/0088* (2013.01)

(58) Field of Classification Search
CPC .......... H01M 8/04291; H01M 8/1004; H01M 8/1016

(Continued)

(56) References Cited

U.S. PATENT DOCUMENTS

| 2002/0034671 A1 | 3/2002 | Ito |
| 2004/0140201 A1 | 7/2004 | Horikawa |

(Continued)

FOREIGN PATENT DOCUMENTS

| JP | 2002008679 A | 1/2002 |
| JP | 201538888 A | 2/2015 |

(Continued)

OTHER PUBLICATIONS

Murat Unlu et al., "Hybrid Anion and Proton Exchange Membrane Fuel Cells", J. Phys. Chem. C, Jun. 4, 2009, pp. 11416-11423, vol. 113, American Chemical Society.

(Continued)

*Primary Examiner* — Bryan D. Ripa
*Assistant Examiner* — James M Erwin
(74) *Attorney, Agent, or Firm* — Cantor Colburn LLP

(57) ABSTRACT

A membrane electrode assembly includes a cation exchange membrane electrode assembly and an anion exchange membrane electrode assembly. The cation exchange membrane includes a cation exchange membrane, a first cathode electrode disposed on the cation exchange membrane, and a first anode electrode disposed under the cation exchange membrane. The anion exchange membrane electrode assembly includes an anion exchange membrane, a second cathode electrode disposed on the anion exchange membrane, and a second anode electrode disposed under the anion exchange membrane. The cation exchange membrane and the anion exchange membrane partially contact each other, and the first cathode electrode, the first anode electrode, the second cathode electrode, and the second anode electrode do not contact one another.

11 Claims, 9 Drawing Sheets

(58) Field of Classification Search
USPC .......................................................... 429/483
See application file for complete search history.

(56) References Cited

U.S. PATENT DOCUMENTS

| | | | |
|---|---|---|---|
| 2006/0199070 A1 | 9/2006 | Min et al. | |
| 2009/0127130 A1* | 5/2009 | Highgate | B01D 69/02 |
| | | | 205/628 |
| 2010/0028736 A1* | 2/2010 | Unlu | H01M 8/1004 |
| | | | 429/494 |

FOREIGN PATENT DOCUMENTS

| | | |
|---|---|---|
| KR | 1020030068584 A | 8/2003 |
| KR | 100787865 B1 | 12/2007 |
| KR | 100864957 B1 | 10/2008 |
| KR | 1020110014455 A | 2/2011 |
| KR | 101201816 B1 | 11/2012 |
| KR | 101669469 B1 | 10/2016 |
| WO | 2009149195 A1 | 12/2009 |

OTHER PUBLICATIONS

Murat Unlu et al., "Hybrid Polymer Electrolyte Fuel Cells: Alkaline Electrodes with Proton Conducting Membrane", Angew. Chem. Int. Ed., 2010, pp. 1299-1301, Wiley-VCH Verlag GmbH & Co. KGaA, Weinheim.

Sikan Peng et al., "A self-humidifying acidic-alkaline bipolar membrane fuel cell", Journal of Power Sources, Sep. 11, 2015, pp. 273-279, vol. 299, Elsevier B.V.

* cited by examiner

MEMBRANE ELECTRODE ASSEMBLY AND FUEL CELL COMPRISING THE SAME

CROSS-REFERENCE TO RELATED APPLICATION

This application claims the priority of Korean Patent Application No. 10-2017-0010891, filed on Jan. 24, 2017, and all the benefits accruing therefrom under 35 U.S.C. § 119, the contents of which in its entirety are herein incorporated by reference.

BACKGROUND

1. Field

The present disclosure relates to a membrane electrode assembly (MEA) and a fuel cell including the same. More particularly, the present disclosure relates to a hybrid membrane electrode assembly (hybrid MEA) and a fuel cell comprising the same.

[Description of the National Support Research and Development]

This study was conducted with the support from Climate Change Response Technology Development Project implemented by the National Research Foundation of Korea (NRF) funded by the Ministry of Science, ICT & Future Planning of Korea under the supervision of Korea Institute of Science and Technology, and the project name is 'Development of Manufacturing Technology of Inexpensive Electrolyte Membrane and Membrane Electrode Assembly (MEA) for High-Temperature PEMFC' (Project Identification No.: 2016937136).

2. Description of the Related Art

A fuel cell has been highlighted as a next-generation energy source due to eco-friendly characteristics such as high energy efficiency and low emission of contaminants, and there are various types according to the electrolyte. Among them, a polymer electrolyte membrane fuel cell (PEMFC) and a solid alkaline fuel cell (SAFC) may be used most suitably for an automobile, an aircraft, and the like, because the fuel cells have advantages in that the electrolyte is a solid, and thus does not cause an electrolyte leakage problem, and the fuel cells can be operated at a relatively low temperature, such as, for example, about 100° C. or less.

At this time, the polymer electrolyte membrane fuel cell (PEMFC) includes a cation exchange membrane capable of transporting hydrogen ions, the solid alkaline fuel cell (SAFC) includes an anion exchange membrane capable of transporting hydroxide ions, and these ion exchange membranes need to contain appropriate moisture in order to maintain ion conductivity. That is, when the corresponding ion exchange membranes are dried, and as a result, the ion conductivity thereof deteriorates, the corresponding fuel cell cannot be operated. For this reason, the polymer electrolyte membrane fuel cell (PEMFC) and the solid alkaline fuel cell (SAFC) essentially further require a humidification system capable of supplying water, in addition to a membrane electrode assembly including the corresponding ion exchange membrane, a fuel electrode, and an air electrode.

However, according to the research results conducted by the present inventors, the humidification system occupies a considerable portion of the corresponding fuel cell, and thus may significantly increase the volume and weight of the corresponding fuel cell. In particular, for a device which requires the minimum volume and weight, such as a drone and an unmanned aircraft, there may be a limitation in using a fuel cell due to the increased volume and weight. Therefore, there is a gradually increasing need for developing a fuel cell which can be operated without a separate humidification system, that is, under a non-humidified condition.

REFERENCES OF THE RELATED ART

Non-Patent Documents (Non-Patent Document 1) A Self-Humidifying Acidic-Alkaline Bipolar Membrane Fuel Cell, (2015)
(Non-Patent Document 2) Hybrid Anion and Proton Exchange Membrane Fuel Cells, (2009)

SUMMARY

In an aspect, the present disclosure is directed to providing a membrane electrode assembly which can be driven stably and efficiently under a non-humidified condition, and a fuel cell including the same.

In another aspect, the present disclosure is directed to providing a fuel cell which can be operated without a humidified system, and thus has significantly decreased volume and weight, and accordingly, may be used for a drone, an unmanned aircraft, and the like.

A membrane electrode assembly (MEA) according to exemplary embodiments to achieve an object of the present disclosure includes a cation exchange membrane electrode assembly and an anion exchange membrane electrode assembly. The cation exchange membrane electrode assembly includes a cation exchange membrane, a first cathode electrode disposed on the cation exchange membrane, and a first anode electrode disposed under the cation exchange membrane. The anion exchange membrane electrode assembly includes an anion exchange membrane, a second cathode electrode disposed on the anion exchange membrane, and a second anode electrode disposed under the anion exchange membrane. The cation exchange membrane and the anion exchange membrane partially contact each other, and the first cathode electrode, the first anode electrode, the second cathode electrode, and the second anode electrode do not contact one another.

In exemplary embodiments, the cation exchange membrane and the anion exchange membrane may partially overlap each other or may partially touch each other through an adhesive, and accordingly, may partially contact each other.

In exemplary embodiments, at a portion in which the cation exchange membrane and the anion exchange membrane contact each other, the first cathode electrode, the first anode electrode, the second cathode electrode, and the second anode electrode are not disposed, and ion exchange and material transfer may not occur.

In exemplary embodiments, the cation exchange membrane electrode assembly may have substantially the same area as or a different area from the anion exchange membrane electrode assembly.

In exemplary embodiments, oxygen may be supplied to the first cathode electrode and the second cathode electrode, and hydrogen may be supplied to the first anode electrode and the second anode electrode.

In exemplary embodiments, when current is generated in the membrane electrode assembly, hydrogen ions ($H^+$) move from the first anode electrode to the first cathode electrode through the cation exchange membrane, and hydroxide ions (OH⁻) move from the second cathode electrode to the second anode electrode, thereby producing water from the first cathode electrode and the second cathode electrode, respectively.

A fuel cell according to exemplary embodiments to achieve an object of the present disclosure may include a membrane electrode assembly according to exemplary embodiments. When current is generated in the fuel cell, water may be produced and supplied in the fuel cell.

In exemplary embodiments, the fuel cell may further include a first gas supply part and a second gas supply part. The first gas supply part may be connected to the first cathode electrode in order to supply oxygen to the first cathode electrode and the second cathode electrode of the membrane electrode assembly. The second gas supply part may be connected to the second anode electrode in order to supply hydrogen to the first anode electrode and the second anode electrode of the membrane electrode assembly.

In exemplary embodiments, the fuel cell may further include a first separator plate and a second separator plate. The first separator plate may be disposed on the membrane electrode assembly so as to contact the first cathode electrode and the second cathode electrode, and may have a first channel part for moving oxygen supplied through the first gas supply part. The second separator plate may be disposed under the membrane electrode assembly so as to contact the first anode electrode and the second anode electrode, and may have a second channel part for moving hydrogen supplied through the second gas supply part.

In exemplary embodiments, the first channel part may be provided on one surface of the first separator plate, in which the first separator plate contacts the first cathode electrode and the second cathode electrode, may be directly connected to the first gas supply part, and may include: a first inlet adjacent to the first cathode electrode; and a first outlet adjacent to the second cathode electrode. The second channel part may be provided on one surface of the second separator plate, in which the second separator plate contacts the first anode electrode and the second anode electrode, may be directly connected to the second gas supply part, and may include: a second inlet adjacent to the second anode electrode; and a second outlet adjacent to the first anode electrode.

In exemplary embodiments, the fuel cell may be a single cell, or a fuel cell stack including one or more single cells.

A membrane electrode assembly according to exemplary embodiments of the present disclosure may be implemented as a hybrid type by including a cation exchange membrane electrode assembly and an anion exchange membrane electrode assembly, that is, a cation exchange membrane, an anion exchange membrane, two cathode electrodes, and two anode electrodes. Accordingly, since the membrane electrode assembly may produce water (H₂O) at both a fuel electrode (an anode electrode) and an air electrode (a cathode electrode), it is possible to easily implement a fuel cell which can be operated stably and efficiently under a non-humidified condition for a long period of time by using the same.

DETAILED DESCRIPTION

Hereinafter, preferred embodiments of the present disclosure will be described in detail with reference to the accompanying drawings.

The Examples of the present disclosure disclosed herein are exemplified for the purpose of describing the Examples of the present disclosure only, and the Examples of the present disclosure may be carried out in various forms and should not be construed to limit the Examples described herein.

Since the present disclosure may have various changes and different forms, it should be understood that the Examples are not intended to limit the present disclosure to specific disclosure forms and they include all the changes, equivalents and replacements included in the spirit and technical scope of the present disclosure.

In the present specification, an area of a cation exchange membrane electrode assembly means an area in which a first cathode electrode and a first anode electrode contact a cation exchange membrane, that is, an area of a portion in which when current is generated in the cation exchange membrane electrode assembly, hydrogen ions substantially move through the corresponding cation exchange membrane.

In the present specification, an area of an anion exchange membrane electrode assembly means an area in which a second cathode electrode and a second anode electrode contact an anion exchange membrane, that is, an area of a portion in which when current is generated in the anion exchange membrane electrode assembly, hydroxide ions substantially move through the corresponding anion exchange membrane.

Membrane Electrode Assembly

Figure 1:
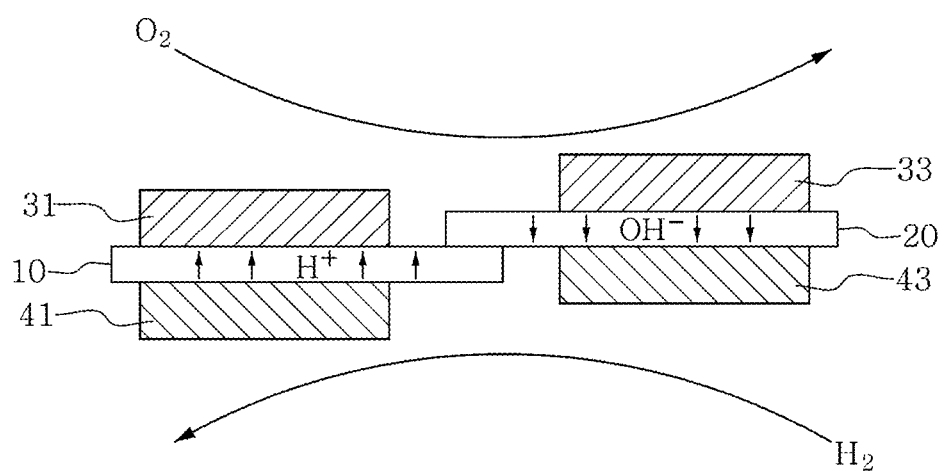
FIG. 1 is a cross-sectional view of a membrane electrode assembly (MEA) according to exemplary embodiments of the present disclosure.

FIG. 1 is a cross-sectional view showing a membrane electrode assembly (MEA) according to exemplary embodiments of the present disclosure.

Referring to FIG. 1, the membrane electrode assembly is a hybrid membrane electrode assembly (hybrid MEA), and includes a cation exchange membrane electrode assembly and an anion exchange membrane electrode assembly. At this time, the cation exchange membrane electrode assembly includes a cation exchange membrane 10, a first cathode electrode 31, and a first anode electrode 41, and the anion exchange electrode assembly includes an anion exchange membrane 20, a second cathode electrode 33, and a second anode electrode 43.

The cation exchange membrane 10 is polymer electrolyte ion exchange membrane provided between the first cathode electrode 31 and the first anode electrode 41, and may have cation conductivity by including, for example, a perfluorinated sulfonic acid (PFSA) polymer such as a Nafion ionomer as an electrolyte. In an embodiment, the cation exchange membrane 10 may be, for example, a cation exchange membrane having a composite structure, including: a porous fluorinated support including a fluorinated polymer such as polytetrafluoroethylene (PTFE); and a perfluorinated sulfonic acid (PFSA) polymer filled in the pores thereof. Alternatively, in another embodiment, a hydrocarbon-based sulfonic acid polymer, which does not include fluorine, may be used as an electrolyte in the cation exchange membrane 10.

The anion exchange membrane 20 may have anion conductivity by including, for example, quaternary ammonium polysulfone (QAPA), and the like as an electrolyte. The anion exchange membrane 20 may be provided between the second cathode electrode 33 and the second anode electrode 43, and may partially contact the cation exchange membrane 10.

Figure 2:
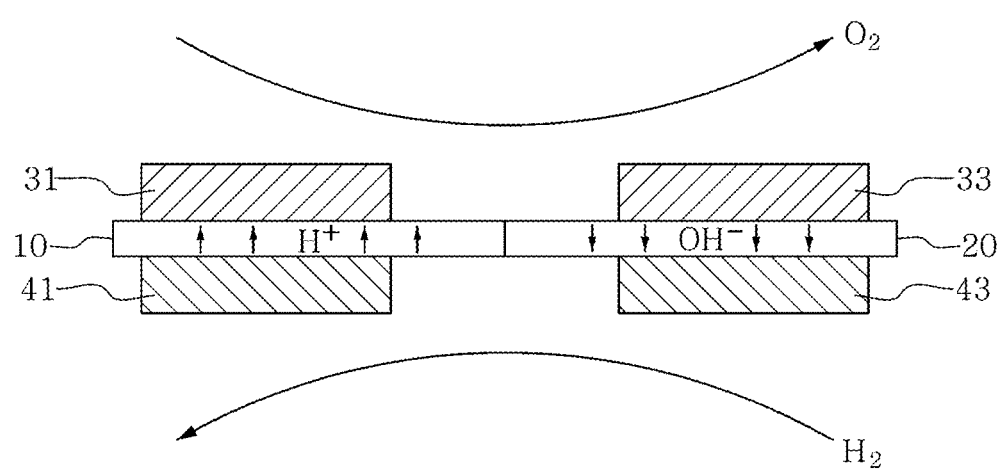
FIG. 2 is a cross-sectional view of a membrane electrode assembly (MEA) according to exemplary embodiments of the present disclosure.

Specifically, in exemplary embodiments, the anion exchange membrane 20 may contact the cation exchange membrane 10 while partially overlapping each other, as shown in FIG. 1. Alternatively, in other exemplary embodiments, the anion exchange membrane 20 may contact the cation exchange membrane 10 while partially touching each other, for example, through an adhesive such as an epoxy-based adhesive, as shown in FIG. 2.

Meanwhile, as shown in FIG. 1, when the cation exchange membrane 10 and the anion exchange membrane 20 contact each other while partially overlapping each other, in fact, the cation exchange membrane 10 and the anion exchange membrane 20 are implemented with a very thin thickness, so that the step difference between the ion exchange membranes 10 and 20 as shown in FIG. 1 may not be substantially present.

The first cathode electrode 31 may be disposed on the cation exchange membrane 10 so as to contact each other, and the first anode electrode 41 may be disposed under the cation exchange membrane 10 so as to contact each other. Accordingly, the first cathode electrode 31 and the first anode electrode 41 may face each other.

The second cathode electrode 33 may be disposed on the anion exchange membrane 20 so as to contact each other, and the second anode electrode 43 may be disposed under the anion exchange membrane 20 so as to contact each other. Accordingly, the second cathode electrode 33 and the second anode electrode 43 may face each other.

However, the first cathode electrode 31, the first anode electrode 41, the second cathode electrode 33, and the second anode electrode 43 may not be disposed at a portion in which the cation exchange membrane 10 and the anion exchange membrane 20 partially contact each other. Accordingly, the first cathode electrode 31 and the second cathode electrode 33 may not contact each other, and the first anode electrode 41 and the second anode electrode 43 may not contact each other. Further, since the ion exchange and material transfer do not occur at a portion in which the cation exchange membrane 10 and the anion exchange membrane 20 overlap each other or contact each other while touching each other, the portion may be insulated.

In exemplary embodiments, an area of the cation exchange membrane electrode assembly (an area in which the first cathode electrode 31 and the first anode electrode 41 contact the cation exchange membrane 10) and an area of the anion exchange membrane electrode assembly (an area in which the second cathode electrode 33 and the second anode electrode 43 contact the anion exchange membrane 20) may be substantially the same as or different from each other.

An oxygen gas ($O_2$) may be supplied to the first cathode electrode 31 and the second cathode electrode 33, and a hydrogen gas ($H_2$) may be supplied to the first anode electrode 41 and the second anode electrode 43. Accordingly, when current is generated in the membrane electrode assembly, hydrogen ions ($H^+$) move from the first anode electrode 41 to the first cathode 31 through the cation exchange membrane 10, hydroxide ions ($OH^-$) move from the second cathode electrode 33 to the second anode electrode 43 through the anion exchange membrane 20, and as a result, water ($H_2O$) may be produced from the first cathode electrode 31 according to the following Reaction Formula 1, and water may be produced from the second anode electrode 43 according to the following Reaction Formula 2.

$$O_2(g)+4H^++4e^-\rightarrow 2H_2O(l) \quad \text{[Reaction Formula 1]}$$

$$2H_2(g)+4OH^-\rightarrow 4H_2O(l)+4e^- \quad \text{[Reaction Formula 2]}$$

Meanwhile, although being not shown, the membrane electrode assembly may further include electrode catalyst layers and gas diffusion layers.

The electrode catalyst layers include: a first electrode catalyst layer provided between the cation exchange membrane 10 and the first cathode electrode 31; a second electrode catalyst layer provided between the cation exchange membrane 10 and the first anode electrode 41; a third electrode catalyst layer provided between the anion exchange membrane 20 and the second cathode electrode 33; and a fourth electrode catalyst layer provided between the anion exchange membrane 20 and the second anode electrode 43, so that total four catalyst layers may be included in the membrane electrode assembly.

The electrode catalyst layers are not particularly limited as long as they are a catalyst which may participate in the electrochemical reaction of a fuel cell including the membrane electrode assembly, but the electrode catalyst layers may include, for example, a Pt-based catalyst.

The Pt-based catalyst may be, for example, platinum, ruthenium, osmium, a platinum-ruthenium alloy, a platinum-osmium alloy, a platinum-palladium alloy, a platinum-M alloy (M is a group consisting of Ga, Ti, V, Cr, Mn, Fe, Co, Ni, Cu, Zn, Sn, Mo, W, Rh, and a combination thereof), and the like. More specifically, the Pt-based catalyst may be Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Fe/Cr, Pt/Ru/Rh/Ni, or Pt/Ru/Sn/W.

Further, in addition, a non-Pt-based catalyst may be used.

The electrode catalyst layers may also include the Pt-based or non-Pt-based catalyst as it is as described above, but may include a Pt-based catalyst supported on a carrier. That is, in exemplary embodiments, the electrode catalyst layers may include a Pt-based catalyst supported on a C-based carrier, such as graphite, denka black, ketjen black, acetylene black, carbon nanotubes, carbon nanofiber, or activated carbon, for example, Pt/C.

The gas diffusion layers include: a first gas diffusion layer provided between the first electrode catalyst layer and the first cathode electrode 31; a second gas diffusion layer provided between the second electrode catalyst layer and the first anode electrode 41; a third gas diffusion layer provided between the third electrode catalyst layer and the second cathode electrode 33; and a fourth gas diffusion layer provided between the fourth electrode catalyst layer and the second anode electrode 43, so that total four gas diffusion layers may be included in the membrane electrode assembly.

As described above, the membrane electrode assembly according to exemplary embodiments of the present disclosure may be implemented as a hybrid type by including a cation exchange membrane electrode assembly and an anion exchange membrane electrode assembly, that is, a cation exchange membrane, an anion exchange membrane, two cathode electrodes, and two anode electrodes. Accordingly, the membrane electrode assembly may produce water ($H_2O$) at both a fuel electrode (an anode electrode) and an air electrode (a cathode electrode), and thus may be utilized for a fuel cell which requires to be operated under a non-humidified condition.

In particular, although the membrane electrode assembly includes both a cation exchange membrane and an anion exchange membrane, the membrane electrode assembly cannot help but have a structure in which a cation exchange membrane and an anion exchange membrane which are combined so as to contact each other between electrodes facing each other in the case where the membrane electrode assembly include each one of a fuel electrode (an anode electrode) and an air electrode (a cathode electrode). Accordingly, when current is generated in the corresponding membrane electrode assembly, various side reactions which are not preferable for operation of the fuel cell may occur at the interface where the ion exchange membranes directly contact each other, and although being produced, water ($H_2O$) remains at the corresponding interface, and as a result, water ($H_2O$) may not be easily produced and supplied at the membrane electrode assembly.

However, in contrast, the membrane electrode assembly according to exemplary embodiments of the present disclosure includes two cathode electrodes (air electrodes) and two anode electrodes (fuel electrodes), and in this case, the electrodes are not disposed at a portion in which the cation exchange membrane and the anion exchange membrane contact each other, and as a result, the portion is insulated, so that it is possible to fundamentally control the occurrence of various side reactions which are not preferable, and furthermore, water ($H_2O$) may be more easily produced and supplied.

Therefore, it is possible to implement a fuel cell which can be operated more stably and efficiently for a long period of time under a non-humidified condition by using the membrane electrode assembly according to exemplary embodiments of the present disclosure.

Manufacturing Method of Membrane Electrode Assembly

The membrane electrode assembly according to exemplary embodiments of the present disclosure may be manufactured by carrying out the following processes.

The cation exchange membrane and the anion exchange membrane as described above are partially contacted with each other.

In exemplary embodiments, the cation exchange membrane and the anion exchange membrane may be contacted with each other by being partially overlapped with each other as shown in FIG. 1, or by being partially touched as shown in FIG. 2 using an adhesive.

A first cathode electrode and a first anode electrode are formed on and under the cation exchange membrane, respectively, and a second cathode electrode and a second anode electrode are formed on and under the anion exchange membrane, respectively.

In exemplary embodiments, the first cathode electrode, the first anode electrode, the second cathode electrode, and the second anode electrode may be formed by applying an electrode material onto the corresponding ion exchange membrane portion except for the portion in which the cation exchange membrane and the anion exchange membrane contact each other. Accordingly, the first cathode electrode and the first anode electrode face each other, the second cathode electrode and the second anode electrode face each other, and the first cathode electrode, the first anode electrode, the second cathode electrode, and the second anode electrode may be formed so as not to contact one another.

Meanwhile, before the first cathode electrode, the first anode electrode, the second cathode electrode, and the second anode electrode are formed, electrode catalyst layers and gas diffusion layers sequentially stacked may be further formed on and under the cation exchange membrane and the anion exchange membrane.

Specifically, a first electrode catalyst layer and a second electrode catalyst layer may be formed so as to face each other on the top surface and the bottom surface of the cation exchange membrane, respectively except for the portion in which cation exchange membrane and the anion exchange membrane contact each other, by using a binder, and a first gas diffusion layer and a second gas diffusion layer may be formed so as to face each other on the first electrode catalyst layer and the second electrode catalyst layer. Further, a third electrode catalyst layer and a fourth electrode catalyst layer may be formed so as to face each other on the top surface and the bottom surface of the anion exchange membrane, respectively except for the portion in which cation exchange membrane and the anion exchange membrane contact each other, by using a binder, and a third gas diffusion layer and a fourth gas diffusion layer may be formed so as to face each other on the third electrode catalyst layer and the fourth electrode catalyst layer. At this time, the electrode catalyst layers may be the same as those described above.

Fuel Cell

Figure 3:
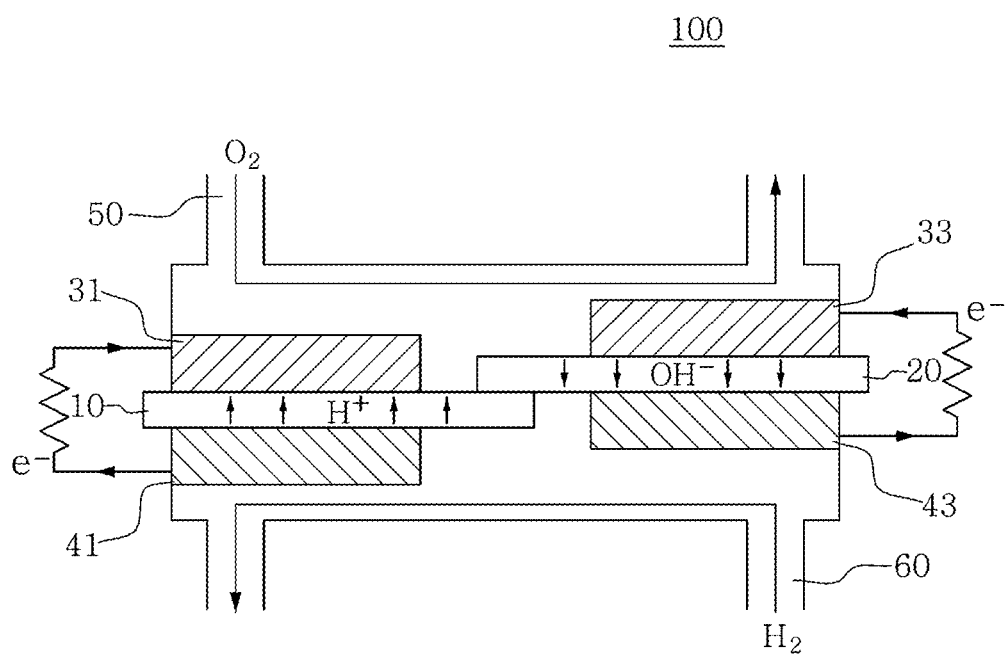
FIG. 3 is a cross-sectional view of a fuel cell (single fuel cell) according to exemplary embodiments of the present disclosure.

FIG. 3 is a cross-sectional view of a fuel cell according to exemplary embodiments of the present disclosure.

Referring to FIG. 3, a fuel cell 100 may include a membrane electrode assembly which is the same as that described above, and accordingly, when current is generated in the fuel cell 100, water ($H_2O$) may be produced and supplied therein from [Reaction Formula 1] and [Reaction Formula 2].

Further, the fuel cell 100 may further include a first gas supply part 50 and a second gas supply part 60.

The first gas supply part 50 is a gas supply part for supplying an oxygen gas ($O_2$) to a first cathode electrode 31 and a second cathode electrode 33 of the membrane electrode assembly. In exemplary embodiments, the first gas supply part 50 may be directly connected to the first cathode electrode 31 so as for an oxygen gas ($O_2$) to move from the first cathode electrode 31 to the second cathode electrode 33, as shown in FIG. 3.

The second gas supply part 60 is a gas supply part for supplying a hydrogen gas ($H_2$) to a first anode electrode 41 and a second anode electrode 43 of the membrane electrode assembly. In exemplary embodiments, the second gas supply part 60 may be directly connected to the second anode electrode 43 so as for a hydrogen gas ($H_2$) to move from the second anode electrode 43 to the first anode electrode 41, as shown in FIG. 3.

The connecting position(s) of the first gas supply part 50 and/or the second gas supply part 60 is(are) not particularly limited as long as an oxygen gas ($O_2$) can be supplied to the first cathode electrode 31 and the second cathode electrode 33 and a hydrogen gas ($H_2$) can be supplied to the first anode electrode 41 and the second anode electrode 43, and various changes can be made. However, when current is generated in the fuel cell 100, specifically considering that water ($H_2O$) is produced from the first cathode electrode 31 and the second anode electrode 43, it may be preferred that the first gas supply part 50 and the second gas supply part 60 are directly connected to the first cathode electrode 31 and the second anode electrode 43, respectively, as shown in FIG. 3. In this case, water ($H_2O$) may be much easily produced and supplied in the fuel cell 100.

Meanwhile, the fuel cell according to exemplary embodiments of the present disclosure may be a single cell as shown in FIG. 3, or may be a fuel cell stack including the same. The fuel cell stack is a fuel cell stack in which a plurality of single cell is stacked, and when the fuel cell according to exemplary embodiments of the present disclosure is a fuel cell stack, the fuel cell may have a structure which is the same as that shown in FIG. 4.

Figure 4:
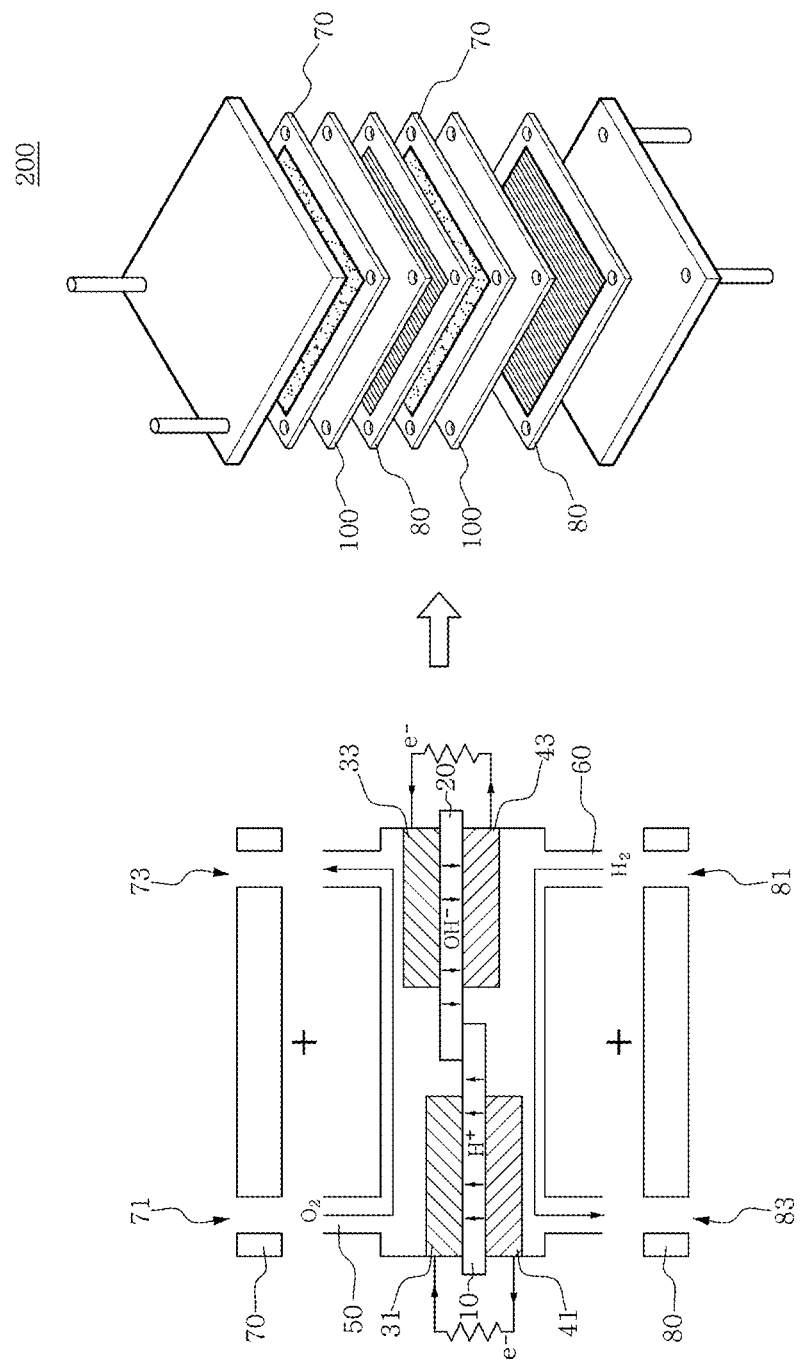
FIG. 4 is a perspective view of a fuel cell stack according to exemplary embodiments of the present disclosure.

FIG. 4 is a perspective view of a fuel cell stack according to exemplary embodiments of the present disclosure.

Referring to FIG. 4, a fuel cell stack 200 is a fuel cell stack in which a plurality of single cell 100 as shown in FIG. 3 is stacked, and may include one or more of the electrode assemblies (see FIG. 1 or 2) as described above. Further, a first separator plate 70 and a second separator 80 provided between two adjacent single cells 100 may be further included by being disposed on and under the single cell 100, that is, on and under the membrane electrode assembly (see FIG. 1 or 2), respectively.

The first separator plate 70 may be disposed on the single cell 100, that is, on a first cathode electrode 31 and a second cathode electrode 33 of the membrane electrode assembly, and thus may be fastened to the single cell 100 so as to contact the first cathode electrode 31 and the second cathode electrode 33. The first separator plate 70 may have a first channel part 75 (see FIG. 5) on one surface thereof, which contacts the first cathode electrode 31 and the second cathode electrode 33, and specifically, may have a structure as shown in FIG. 5 in exemplary embodiments.

Figure 5:
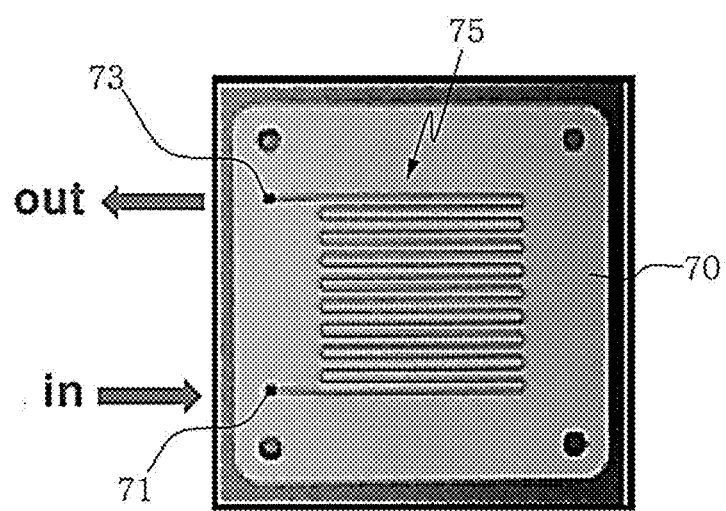
FIG. 5 is a photograph of a first separator plate according to exemplary embodiments of the present disclosure.

Referring to FIG. 5, the first channel part 75 is for moving an oxygen gas ($O_2$) supplied through the first gas supply part 50 (see FIG. 3), and may include: a first inlet 71 through which an oxygen gas ($O_2$) flows in; and a first outlet 73 through which the oxygen gas ($O_2$) is discharged. In exemplary embodiments, the first inlet 71 may be directly connected to the first gas supply part 50 (see FIG. 3) and may be adjacent to the first cathode electrode 31, and the first outlet 73 may be adjacent to the second cathode electrode 33. The structure of the first channel part 75 may contribute to facilitating production and supply of water ($H_2O$) in the fuel cell stack 200.

The first separator plate 80 may be disposed under the single cell 100, that is, under a first anode electrode 41 and a second anode electrode 43 of the membrane electrode assembly, and thus may be fastened to the single cell 100 so as to contact the first anode electrode 41 and the second anode electrode 43. The second separator plate 80 may have a second channel part 85 (see FIG. 6) on one surface thereof, which contacts the first anode electrode 41 and the second anode electrode 43, and specifically, may have a structure as shown in FIG. 6 in exemplary embodiments.

Figure 6:
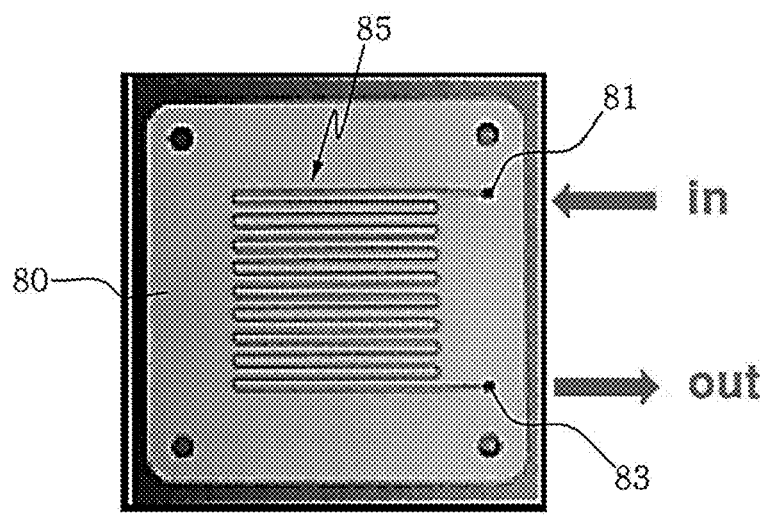
FIG. 6 is a photograph of a second separator plate according to exemplary embodiments of the present disclosure.

Referring to FIG. 6, the second channel part 85 is for moving an hydrogen gas ($H_2$) supplied through the second gas supply part 60 (see FIG. 3), and may include: a second inlet 81 through which a hydrogen gas ($H_2$) flows in; and a second outlet 83 through which the hydrogen gas ($H_2$) is discharged. In exemplary embodiments, the second inlet 81 may be directly connected to the second gas supply part 60 (see FIG. 3) and may be adjacent to the second anode electrode 43, and the second outlet 83 may be adjacent to the first anode electrode 41. The structure of the second channel part 85 may contribute to facilitating production and supply of water ($H_2O$) in the fuel cell stack 200.

Since the fuel cell according to exemplary embodiments of the present disclosure may produce and supply water ($H_2O$) by itself therein without any supply of water ($H_2O$) from the outside, the fuel cell may be operated under a non-humidified condition.

In particular, the oxygen gas ($O_2$) is directly supplied to the first cathode electrode to flow from the first cathode electrode to the second cathode electrode, and the hydrogen gas ($H_2$) is directly supplied to the second anode electrode to flow from the second anode electrode to the first anode electrode, thereby facilitating production and supply of water ($H_2O$) in the fuel cell, so that the fuel cell can be operated more stably and efficiently under a non-humidified condition for a long period of time.

The present disclosure will be described in more detail through the following Examples. However, the Examples are provided for exemplifying the present disclosure, and the scope of the present disclosure is not limited thereto.

EXAMPLES

Hereinafter, the present disclosure will be described in detail through an example and test examples. However, the following example and test examples are for illustrative purposes only and it will be apparent to those of ordinary skill in the art that the scope of the present disclosure is not limited by them.

A Nafion 211 (Dupont) and a Tokuyama membrane (Tokuyama) were contacted with each other by partially overlapping each other. Except for a portion in which the Nafion 211 (Dupont) and the Tokuyama membrane (Tokuyama) contacted each other, a first electrode catalyst layer and a second electrode catalyst layer, each including Pt/C and each having a size of 2.5 cm×5.0 cm, were formed on the top surface and the bottom surface of the Nafion 211 (Dupont) by using a Nafion binder, and a third electrode catalyst layer and a fourth electrode catalyst layer, each including Pt/C and each having a size of 2.5 cm×5.0 cm, were formed on the top surface and the bottom surface of the Tokuyama membrane (Tokuyama) by using a Tokuyama binder. Subsequently, a first cathode electrode and a second cathode electrode were formed to each have a size of 2.5 cm×5.0 cm by applying an electrode material onto the first electrode catalyst layer and the third electrode catalyst layer, and a first anode electrode and a second anode electrode were formed to each have a size of 2.5 cm×5.0 cm by applying an electrode material onto the second electrode catalyst layer and the fourth electrode catalyst layer. Accordingly, a hybrid membrane electrode assembly including a cation exchange membrane electrode assembly and an anion exchange membrane electrode assembly was manufactured.

Figure 7:
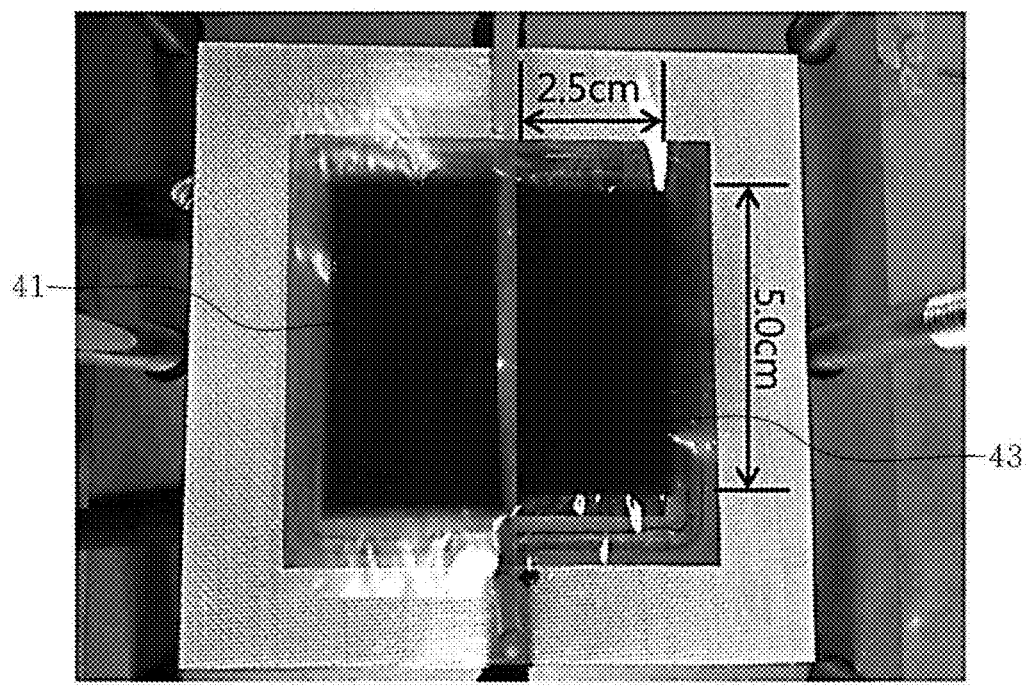
FIG. 7 is a photograph of a fuel cell to which a first anode electrode and a second anode electrode are applied according to the Example of the present disclosure.

Thereafter, a single cell (single fuel cell) having the structure as shown in FIG. 7 and including the membrane electrode assembly was manufactured by connecting the first gas supply part to the first cathode electrode and connecting the second gas supply part to the second anode electrode. FIG. 7 is a photograph of a portion of the single cell, onto which the first anode electrode and the second anode electrode are applied.

Current was generated in the single cell, an oxygen gas ($O_2$) was supplied to the first cathode electrode and the second cathode electrode through the first gas supply part, and a hydrogen gas ($H_2$) was supplied to the first anode electrode and the second anode electrode through the second gas supply part, thereby operating the single cell under a non-humidified condition (without any supply of water ($H_2O$) from the outside).

Evaluation of Resistance Characteristics of Fuel Cell

In order to evaluate resistance characteristics of the fuel cell, the current (I)-voltage (V) variation was measured by operating the single cells manufactured in the Examples at a temperature of 50° C. under a non-humidified condition. At this time, an oxygen gas ($O_2$) was supplied to the first cathode electrode and the second cathode electrode through the first gas supply part, a hydrogen gas ($H_2$) was supplied to the second anode electrode and the first anode electrode through the second gas supply part, and current was varied from 0.0 A to 1.1 A while operating the single cell. The results are as shown in FIG. 8.

Figure 8:
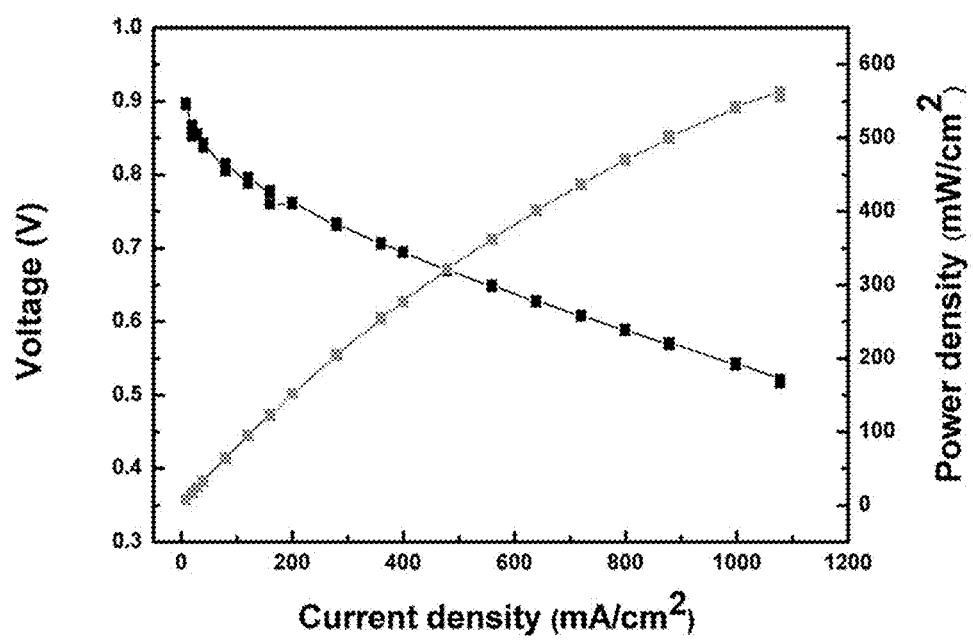
FIG. 8 is a graph showing an evaluation result of resistance characteristics of a fuel cell manufactured according to the Example of the present disclosure.

Referring to FIG. 8, it could be confirmed that when the single cells manufactured according to the Examples were operated at a temperature of 50° C. under a non-humidified condition, the current (I)-voltage (V) variation was constant. Through this, it could be seen that through the membrane electrode assembly (MEA) according to exemplary embodiments of the present disclosure, a fuel cell capable of being stably driven could be implemented without any change in resistance (R) under a non-humidified condition.

Evaluation of Performance of Fuel Cell

In order to evaluate the performance of the fuel cell, the current (I)-voltage (V) variation was measured while operating the single cells manufactured according to the Examples at a temperature of 50° C. under a non-humidified condition for up to 250 hours. At this time, moisture in the single cell was completely removed by operating the single cell for 2 hours while maintaining the temperature of 50° C. and the non-humidified condition, and then the current density variation was measured by operating the single cell at 0.6 V for up to 250 hours while supplying the oxygen gas ($O_2$) and the hydrogen gas ($H_2$) under the same condition. The results are as shown in FIG. 9.

Figure 9:
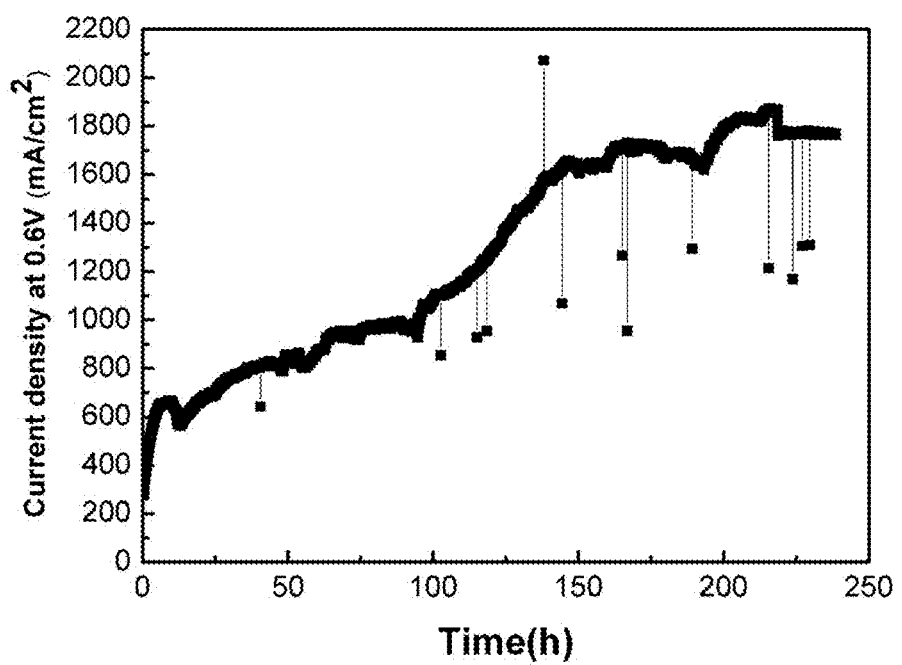
FIG. 9 is a graph showing an evaluation result the performance of a fuel cell manufactured according to the Example of the present disclosure.

Referring to FIG. 9, it could be confirmed that the single cell manufactured according to the Example began to exhibit a stable performance from about 150 hours, and the performance was stably maintained until 250 hours elapsed. That is, considering that the existing fuel cells could not be operated under the same condition (operated at 50° C. under a non-humidified condition in a state where moisture was not contained therein at all), and thus did not show performance at all, it could be confirmed that the single cell manufactured according to the Example had a significant difference in terms of performance.

Therefore, it can be seen that it is possible to easily implement a fuel cell which can be operated under a non-humidified condition and can be operated stably and efficiently for a long period of time by using the membrane electrode assembly according to exemplary embodiments of the present disclosure.

EXPLANATION OF REFERENCE NUMERALS AND SYMBOLS

10: Cation exchange membrane
20: Anion exchange membrane
31, 33: First and second cathode electrodes
41, 43: First and second anode electrodes
50, 60: First and second gas supply parts
70, 80: First and second separator plates
71, 81: First and second inlets
73, 83: First and second outlets
75, 85: First and second channel parts
100: Fuel cell (Single fuel cell)
200: Fuel cell stack

What is claimed is:

1. A membrane electrode assembly comprising:
a cation exchange membrane electrode assembly comprising a cation exchange membrane, a first cathode electrode disposed on the cation exchange membrane, and a first anode electrode disposed under the cation exchange membrane; and
an anion exchange membrane electrode assembly comprising an anion exchange membrane, a second cathode electrode disposed on the anion exchange membrane, and a second anode electrode disposed under the anion exchange membrane,
wherein the cation exchange membrane and the anion exchange membrane partially contact each other, and the first cathode electrode, the first anode electrode, the second cathode electrode, and the second anode electrode do not contact one another.

2. The membrane electrode assembly according to claim 1, wherein the cation exchange membrane and the anion exchange membrane contact each other by being partially overlapped with each other, or by being partially touched through an adhesive.

3. The membrane electrode assembly according to claim 1, wherein at a portion in which the cation exchange membrane and the anion exchange membrane contact each other, the first cathode electrode, the first anode electrode, the second cathode electrode, and the second anode electrode are not disposed, and ion exchange and material transfer do not occur.

4. The membrane electrode assembly according to claim 1, wherein the cation exchange membrane electrode assembly has the same area as or a different area from the anion exchange membrane electrode assembly.

5. The membrane electrode assembly according to claim 1, wherein oxygen is supplied to the first cathode electrode and the second cathode electrode, and hydrogen is supplied to the first anode electrode and the second anode electrode.

6. The membrane electrode assembly according to claim 1, wherein when current is generated in the membrane electrode assembly, hydrogen ions ($H^+$) move from the first anode electrode to the first cathode electrode through the cation exchange membrane, and hydroxide ions ($OH^-$) move from the second cathode electrode to the second anode electrode, thereby producing water from the first cathode electrode and the second cathode electrode, respectively.

7. A fuel cell comprising the membrane electrode assembly according to claim 1,
wherein when current is generated in the fuel cell, water is optionally produced and supplied in the fuel cell.

8. The fuel cell according to claim 7, further comprising:
a first gas supply part connected to the first cathode electrode in order to supply oxygen to the first cathode electrode and the second cathode electrode of the membrane electrode assembly; and
a second gas supply part connected to the second anode electrode in order to supply hydrogen to the first anode electrode and the second anode electrode of the membrane electrode assembly.

9. The fuel cell according to claim 8, further comprising:
a first separator plate disposed on the membrane electrode assembly so as to contact the first cathode electrode and the second cathode electrode, and having a first channel part for moving oxygen supplied through the first gas supply part; and a second separator plate disposed under the membrane electrode assembly so as to contact the first anode electrode and the second anode electrode, and having a second channel part for moving hydrogen supplied through the second gas supply part.

10. The fuel cell according to claim 9, wherein the first channel part is provided on one surface of the first separator plate, in which the first separator plate contacts the first cathode electrode and the second electrode, is directly connected to the first gas supply part, and comprises:

a first inlet adjacent to the first cathode electrode; and a first outlet adjacent to the second cathode electrode, and the second channel part is provided on one surface of the second separator plate, in which the second separator plate contacts the first anode electrode and the second anode electrode, is directly connected to the second gas supply part, and comprises:

a second inlet adjacent to the second anode electrode; and a second outlet adjacent to the first anode electrode.

11. The fuel cell according to claim 7, wherein the fuel cell is a single cell, or a fuel cell stack comprising one or more single cells.

\* \* \* \* \*